(12) United States Patent
Baek

(10) Patent No.: US 10,230,293 B2
(45) Date of Patent: Mar. 12, 2019

(54) POWER SUPPLY APPARATUS FOR SUB-MODULE OF MMC

(71) Applicant: HYOSUNG HEAVY INDUSTRIES CORPORATION, Seoul (KR)

(72) Inventor: Yo-Han Baek, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 15/538,144

(22) PCT Filed: Dec. 29, 2015

(86) PCT No.: PCT/KR2015/014398
§ 371 (c)(1),
(2) Date: Jun. 20, 2017

(87) PCT Pub. No.: WO2016/108571
PCT Pub. Date: Jul. 7, 2016

(65) Prior Publication Data
US 2017/0353098 A1    Dec. 7, 2017

(30) Foreign Application Priority Data

Dec. 29, 2014  (KR) .......................... 10-2014-0192749

(51) Int. Cl.
*H02M 1/08* (2006.01)
*H02M 7/539* (2006.01)
(Continued)

(52) U.S. Cl.
CPC ............... *H02M 1/08* (2013.01); *H02M 7/19* (2013.01); *H02M 7/49* (2013.01); *H02M 7/539* (2013.01);
(Continued)

(58) Field of Classification Search
CPC .................. H02M 1/08; H02M 7/539; H02M 2001/0048; H02M 1/32; H02M 1/36;
(Continued)

(56) References Cited

U.S. PATENT DOCUMENTS 4,794,270 A * 12/1988 Park .................. H02M 3/33576
307/22
6,069,805 A *  5/2000 Anderson, Jr. ......... H02M 1/36
363/132
(Continued)

FOREIGN PATENT DOCUMENTS

EP         0651310 A    5/1995
EP         2579436 A2   4/2013
(Continued)

*Primary Examiner* — Gustavo Rosario Benitez
(74) *Attorney, Agent, or Firm* — Novick, Kim & Lee, PLLC; Jae Youn Kim

(57) ABSTRACT

Provided is a power supply apparatus for sub-modules of a Modular Multilevel Converter (MMC) which stably supplies power to the sub-modules of the MMC in connection with an HVDC system. The power supply apparatus for sub-modules of an MMC can include a charging unit in which an input voltage between P and N busses of the MMC is stored, a relay unit connected in parallel with the charging unit, a resistor connected in series with the relay unit, a TVS diode connected in series with the resistor, a Zener diode connected in series with the TVS diode, a transformer for delivering the input voltage (in a primary winding) to a secondary winding thereof, and a switch for switching the flow of current supplied to the transformer.

6 Claims, 6 Drawing Sheets

(51) Int. Cl.
*H02M 1/00* (2006.01)
*H02M 7/19* (2006.01)
*H02M 7/49* (2007.01)
*H02M 7/483* (2007.01)

(52) U.S. Cl.
CPC ............... *H02M 2001/0006* (2013.01); *H02M 2001/007* (2013.01); *H02M 2001/0048* (2013.01); *H02M 2007/4835* (2013.01)

(58) Field of Classification Search
CPC ... H02M 2001/007; H02M 2001/0083; H02M 2001/006; H02M 1/096; H02M 3/33523; H02M 3/33553; H02M 7/42; H02M 7/44; H02M 7/483; H02M 7/49
See application file for complete search history.

(56) References Cited

U.S. PATENT DOCUMENTS

| | | | |
|---|---|---|---|
| 6,449,180 B1* | 9/2002 | Yang | H02M 1/10 363/142 |
| 2004/0070375 A1 | 4/2004 | Formanek | |
| 2008/0191679 A1 | 8/2008 | Williams | |
| 2010/0244804 A1* | 9/2010 | Zong | H02M 1/36 323/299 |
| 2011/0228565 A1* | 9/2011 | Griffin | H02M 1/36 363/21.01 |
| 2013/0083560 A1* | 4/2013 | Hsieh | H02M 3/33523 363/16 |
| 2014/0063875 A1* | 3/2014 | Al-Shyoukh | H02M 1/36 363/49 |
| 2014/0169046 A1* | 6/2014 | Chen | H02M 1/4225 363/39 |
| 2018/0183353 A1* | 6/2018 | Baek | H02M 1/084 |

FOREIGN PATENT DOCUMENTS

| | | |
|---|---|---|
| JP | 58172978 A | 10/1983 |
| JP | 60098871 A | 6/1985 |
| JP | 07-7077513 A | 8/1995 |
| JP | 2008-312359 A | 12/2008 |
| JP | 2014-180110 A | 9/2014 |
| KR | 10-2013-0135979 A | 12/2013 |
| WO | 2014-117847 A1 | 8/2014 |

* cited by examiner

"PRIOR ART"

"PRIOR ART"

POWER SUPPLY APPARATUS FOR SUB-MODULE OF MMC

TECHNICAL FIELD

The present invention relates, in general, to a power supply apparatus and, more particularly, to a power supply apparatus for sub-modules of a Modular Multilevel Converter (MMC), which stably supplies power to the sub-modules of an MMC, which is related to a High-Voltage Direct Current (HVDC) system.

BACKGROUND ART

Generally, in a High-Voltage Direct Current (HVDC) system, AC power, produced in a power plant, is converted into DC power and then transmitted, and the transmitted DC power is converted into AC power on a power reception side and then supplied to a load. The HVDC system may transmit power effectively and economically by increasing voltage, and is advantageous in that it allows interconnection between asynchronous grids and efficient power transmission over long distances.

In the HVDC system, a Modular Multilevel Converter (MMC) is used for power transmission and compensation for reactive power. Such an MMC includes multiple sub-modules, which are connected in series with each other. Because the sub-modules are very important components in the MMC, a power supply apparatus for stably supplying power to the sub-modules in various environments is required.

FIG. 1 is an equivalent circuit diagram of an MMC, and FIG. 2 is a circuit diagram of a conventional power supply apparatus for the sub-modules of an MMC. As is well known, an MMC consists of one or more phase modules 1, and each of the phase modules includes multiple sub-modules 10, which are connected in series with each other. Also, each of the phase modules 1 is connected with a positive (+) DC voltage bus P and a negative (−) DC voltage bus N. The input voltage between the P and N buses is input to the sub-module 10 through connection terminals X1 and X2.

In order to supply power necessary for the operation of sub-modules, a power supply apparatus for sub-modules of an MMC converts a high voltage (about 2 to 3 kV) between the P and N buses into a low voltage (about 300 to 600V) and supplies the low voltage to the sub-modules. To this end, in the conventional power supply apparatus 20, while an input voltage between the P and N buses of the MMC increases from 0V to a high voltage (for example, 3 kV), the voltage Vdc is stored in a capacitor 21. That is, while the voltage Vdc, which is the input voltage between the P and N buses, increases from 0V to 1000V, the clamping voltage Vzd of a Zener diode (ZD) 23 is output to a controller 24, and when the clamping voltage Vzd is input to the controller 24, the controller 24 enables current to be supplied to a transformer 26 by turning on a switch. Accordingly, when a voltage Pcon, output from the secondary winding of the transformer 26, is applied to the controller 24, the controller 24 operates the power supply apparatus 20.

In this case, the power supply apparatus 20 starts to operate even if the input voltage Vdc is lower than the rated voltage of the power supply apparatus 20, but the operation is interrupted without producing normal output due to the low input voltage. Here, the operation is repeatedly resumed and interrupted while the input voltage increases, and such repetition finishes when the input voltage reaches the rated voltage. When the input voltage reaches the rated voltage and the output of the power supply apparatus 20 becomes normal, the voltage Pcon output from the secondary winding of the transformer 26 supplies power to the controller 24.

As described above, in the conventional art, the power supply apparatus 20 starts to operate even if the input voltage is lower than the rated voltage at the beginning, but the apparatus cannot operate normally. Also, because current continuously flows to a resistor 22 and a Zener diode 23 in the state in which the input voltage reaches a high-voltage section while the input voltage continuously increases, heat is generated in these elements 22 and 23, which generates energy loss.

Therefore, in the technical field pertaining to a power supply apparatus for sub-modules of an MMC in connection with an HVDC system, the development of technology for a power supply apparatus that may eliminate unnecessary operation and reduce loss is required.

DISCLOSURE

Technical Problem

An object of the present invention is to provide a power supply apparatus for sub-modules of an MMC, which may adjust the time at which to start the operation of the power supply apparatus for the sub-modules of the MMC in connection with an HVDC system.

Also, another object of the present invention is to provide a power supply apparatus for sub-modules of an MMC, which may eliminate heat and power loss occurring in the internal elements even if an input voltage reaches a high-voltage section in the power supply apparatus.

Technical Solution

An apparatus for supplying power to a sub-module of a Modular Multilevel Converter (MMC) according to the present invention includes a charging unit in which an input voltage between P and N buses of the MMC is stored; a relay unit connected in parallel with the charging unit; a resistor connected in series with the relay unit; a TVS diode connected in series with the resistor; a Zener diode connected in series with the TVS diode; a transformer for delivering the input voltage (in a primary winding) to a secondary winding thereof; a switch for switching a flow of current supplied to the transformer; a control unit for enabling current to flow to the transformer by turning on the switch upon receiving a clamping voltage of the Zener diode; and a relay switching unit for operating the relay unit upon receiving a voltage output from the secondary winding of the transformer.

In the present invention, the input voltage increases from 0V to a predetermined maximum voltage (Vmax).

In the present invention, the relay unit includes a b-contact switch, an initial state of which is set to a shorted state, and before the increasing input voltage reaches a rated voltage for starting the power supply apparatus, the TVS diode does not conduct current, which is supplied through the b-contact switch, whereby no current flows to the control unit.

In the present invention, when the input voltage increases and reaches the rated voltage, the TVS diode conducts the supplied current so as to be supplied to the control unit, and the control unit turns on the switch when the supplied current is applied thereto.

In the present invention, when the switch is turned on, a primary voltage is supplied to the transformer by the supplied current, the transformer outputs a secondary voltage by delivering the primary voltage to the secondary winding, and the relay switching unit receives the secondary voltage and opens the b-contact switch of the relay unit.

In the present invention, after the b-contact switch of the relay unit is opened, the clamping voltage of the Zener diode is not input to the control unit, and the control unit operates by receiving the secondary voltage of the transformer as operating power.

Advantageous Effects

A startup voltage control device of a power supply apparatus for sub-modules of an MMC according to the present invention may enable adjustment of the time at which to start the power supply apparatus depending on the magnitude of an input voltage.

Also, according to the present invention, after a power supply apparatus starts operation and reaches a normal state, the flow of current to a resistor and a Zener diode is interrupted, thus eliminating power loss in the resistor and the Zener diode.

BEST MODE

Figure 1:
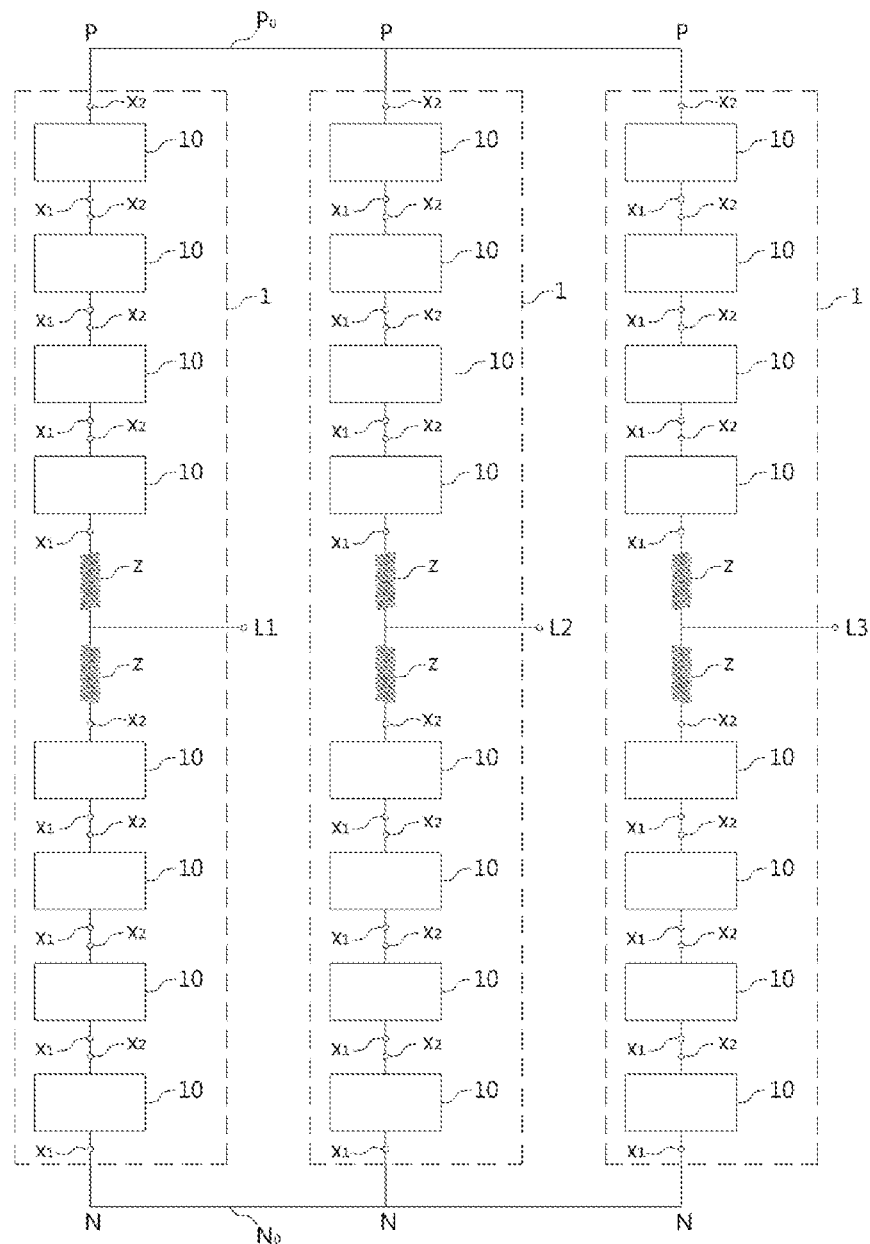
FIG. 1 is an equivalent circuit diagram of a general MMC.
Figure 2:
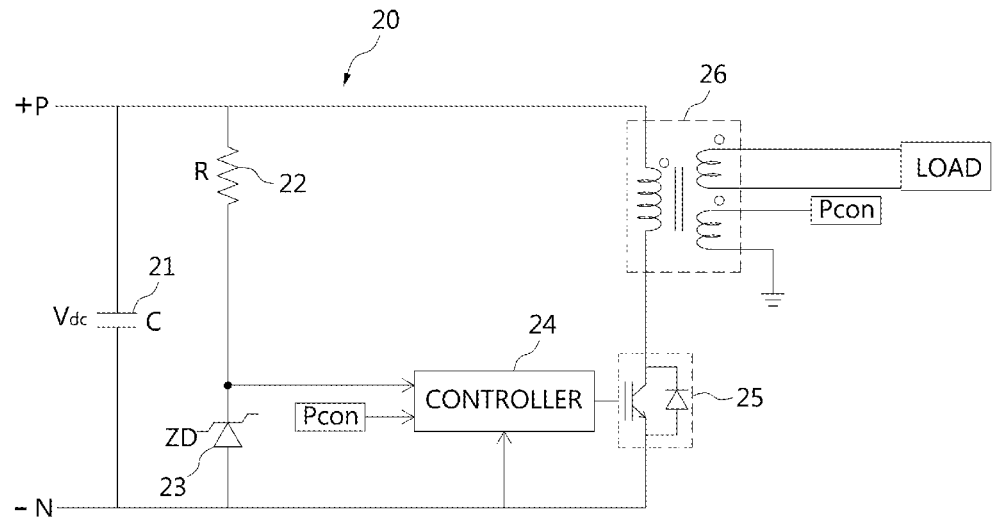
FIG. 2 is a circuit diagram of a conventional power supply apparatus for sub-modules of an MMC.

Hereinafter, some embodiments of the present invention will be described in detail with reference to exemplary drawings. Reference should now be made to the drawings, in which the same reference numerals are used throughout the different drawings to designate the same or similar components. In the following description, it is to be noted that, when the functions of conventional elements and the detailed description of elements related with the present invention may make the gist of the present invention unclear, a detailed description of those elements will be omitted.

It will be understood that, although the terms "first," "second," "A," "B," "(a)," "(b)," etc. may be used herein to describe various elements, these terms are only used to distinguish one element from another element, and the essentials or the order of these elements should not be limited by these terms. When a first element is described as being "connected," "combined," or "coupled" to a second element, it should be understood that the first element may be directly connected or coupled to the second element, or that another element may alternatively be "connected," "combined" or "coupled" therebetween.

Figure 3:
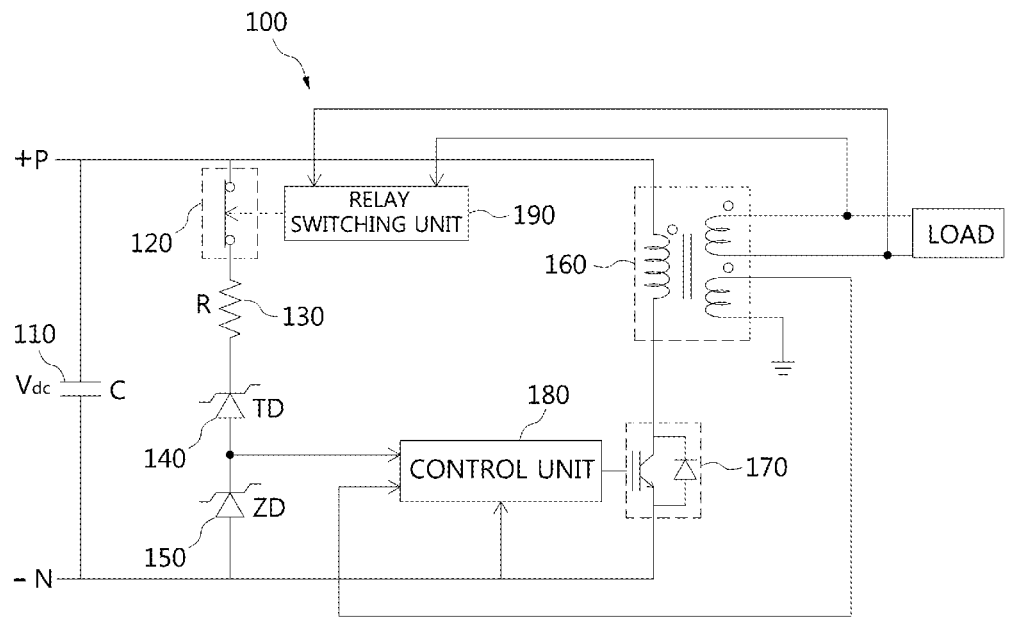
FIG. 3 is a circuit diagram of a power supply apparatus for sub-modules of an MMC according to an embodiment of the present invention.

FIG. 3 is a circuit diagram of a power supply apparatus for sub-modules of an MMC according to an embodiment of the present invention.

Referring to FIG. 3, a power supply apparatus 100 for sub-modules of an MMC according to an embodiment of the present invention is applied to an MMC that includes one or more phase modules. Specifically, the power supply apparatus supplies power to the multiple sub-modules constituting each of the phase modules of the MMC. To this end, the power supply apparatus 100 of the present invention starts to operate by receiving a high voltage between the positive (+) P bus and the negative (−) N bus, to which each of the phase modules is connected, and supplies necessary power to the sub-modules when it can produce normal output.

The power supply apparatus 100 according to an embodiment of the present invention is configured to include a charging unit 110, a relay unit 120, a resistor 130, a TVS diode (TD) 140, a Zener diode (ZD) 150, a transformer 160, a switch 170, a relay switching unit 190, and a control unit 180.

The charging unit 110 stores the input voltage between the P and N buses of the MMC. While the input voltage between the P and N buses of the MMC increases from 0V to the predetermined maximum voltage Vmax, the input voltage is stored in the charging unit 110. The charging unit 110 may include, for example, a capacitor.

The relay unit 120 is connected in parallel with the charging unit 110. The relay unit 120 includes a b-contact switch, the contact point of which is initially set to a shorted state. That is, because the b-contact switch is closed at the beginning, when current is applied, the current may flow. Here, when a voltage is applied to the relay unit 120, the relay unit 120 operates and the b-contact switch becomes an open state, and thus the flow of current is interrupted.

The resistor 130, the TVS diode 140, and the Zener diode 150 are connected in series with the relay unit 120. The order in which these elements are connected in series may be freely set, but desirably, the relay unit 120 may be connected in series to the resistor 130, the TVS diode 140, and the Zener diode 150, which are first connected in series in the order in which they have mentioned. Here, the TVS diode 140 is a Transient Voltage Suppressor diode, which conducts current only when a voltage equal to or greater than a predetermined voltage is applied thereto. The Zener diode 150 makes a constant clamping voltage be supplied to the control unit 180.

The transformer 160 receives the input voltage between the P and N buses as a primary voltage and delivers the primary voltage to the secondary winding thereof. Here, when the power supply apparatus 100 is operated, the transformer 160 converts the high voltage between the P and N buses into a low voltage, required for a load (i.e. sub-modules), according to the ratio of primary to secondary winding turns and outputs the low voltage. The voltage output from the secondary winding of the transformer 160 is input to the relay switching unit 180. Also, the voltage output from the secondary winding of the transformer 160 is input to the control unit 180. Here, the voltage input to the relay switching unit 190 may be the same as or different from the voltage input to the control unit 180. If the two voltages must differ from each other, the secondary winding of the transformer 160 is divided into two coils having different ratios of winding turns, whereby the two coils may output different voltages.

The switch 170 controls the flow of current in order to supply the current, generated from the input voltage between the P and N buses, to the transformer 160. The switching operation of the switch 170 is controlled by the control unit 180, which will be described later. When the switch 170 is turned on, the current, generated from the input voltage charged in the charging unit 110, flows in the closed circuit formed by the transformer 160 and the switch 170, and the transformer 160 delivers the voltage of the primary winding to the secondary winding. The switch 170 according to the present invention is a power semiconductor element, which is able to be turned on. For example, it may be implemented as a thyristor, or a power semiconductor element, the turn-on/turn-off control of which is possible, such as a GTO, IGCT, IGBT, or the like.

When current is applied in the state in which the b-contact switch is shorted at the beginning, the control unit 180 turns on the switch 170 and thereby makes the supplied current flow through the switch 170. In other words, as the switch 170 is turned on, a closed circuit is formed through the switch 170, and the current, supplied by the input voltage, is supplied to the transformer 160. This current flow makes the input voltage Vdc, stored in the charging unit 110, be supplied to the primary winding of the transformer 160, and the transformer 160 converts the voltage into a low voltage according to the ratio of winding turns and outputs the low voltage as the secondary voltage. The secondary voltage is input to the control unit 180 and used as the power for operating the power supply apparatus 100.

As described above, the relay switching unit 190 receives the voltage output from the secondary winding of the transformer 160 and operates the relay unit 120. Specifically, if the voltage output from the secondary winding of the transformer 160 is input to the relay switching unit 190, the b-contact switch in the relay unit120, which has been initially set to the shorted state, is switched to an open state. Accordingly, the current that flows through the relay unit 120 is interrupted, and thus no current is supplied to the control unit 180 through the relay unit 120. In other words, after the relay switching unit 190 switches the b-contact switch to an open state, only the voltage output from the secondary winding of the transformer 160 is supplied to the control unit 180, and this voltage is used as power for operating the power supply apparatus 100.

As described above, in the power supply apparatus 100 according to the present invention, the input voltage, which is a high voltage between the P and N buses of the MMC, is stored in the charging unit 110, and the input voltage Vdc, stored in the charging unit 110, is input to the transformer 160 as the primary voltage thereof and converted into a secondary voltage so as to be used as power for operating the power supply apparatus 100. Here, the power supply apparatus 100 is made to start its operation only when the input voltage is equal to or greater than the rated voltage thereof, whereby unnecessary switching operations may be eliminated and power loss may be minimized.

In other words, the power supply apparatus 100 of the present invention is configured such that while the input voltage between the P and N buses increases from 0V to the predetermined maximum voltage Vmax, unless the input voltage reaches a rated voltage for starting the power supply apparatus 100, the TVS diode 140 interrupts the supply of current to the control unit 180 in order to prevent the power supply apparatus 100 from being started. After the input voltage reaches the rated voltage, the TVS diodes 140 conducts the current, and thus the power supply apparatus 100 may start to operate.

Hereinafter, the operation of the power supply apparatus 100 is described in detail with reference to FIGS. 4 to 7. FIGS. 4 to 7 are exemplary views illustrating the flow of current based on the operation of the power supply apparatus for sub-modules of an MMC according to an embodiment of the present invention.

Figure 4:
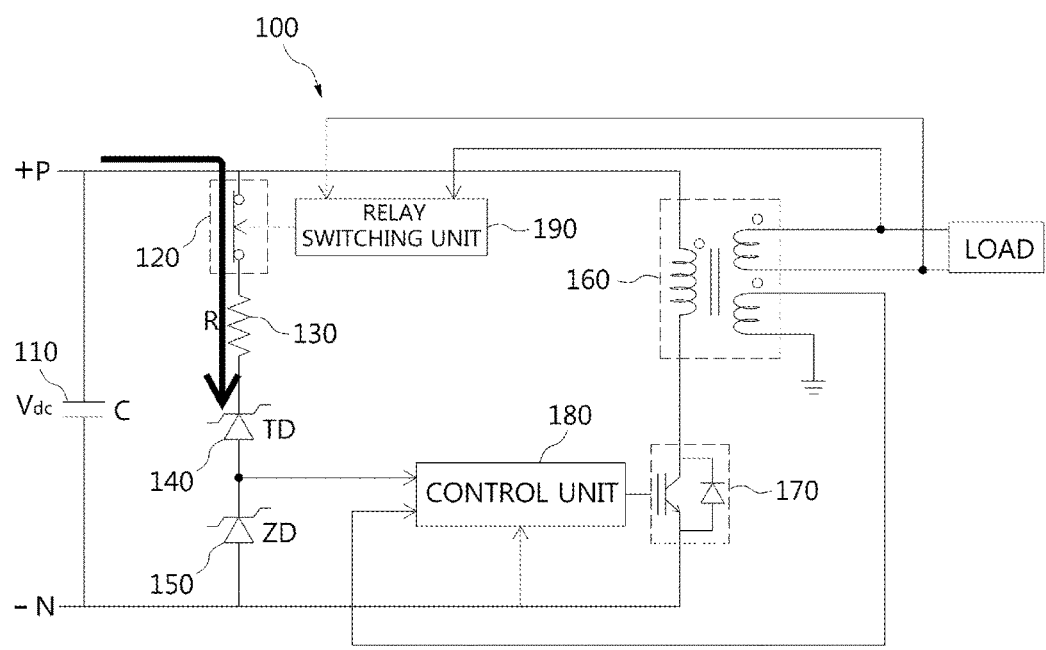
FIGS. 4 to 7 are views illustrating the flow of current resulting from the operation of a power supply apparatus for sub-modules of an MMC according to the present invention.

As illustrated in the example of FIG. 4, the input voltage between the P and N buses starts to increase from 0V, and this input voltage is stored in the charging unit 110. Because the b-contact switch in the relay unit 120 is initially set to a shorted state, the current, supplied by the input voltage, flows to the TVS diode 140 via the relay unit 120 and the resistor 130. However, because the TVS diode 140 is an element that conducts current only when a voltage equal to or greater than a predetermined voltage is applied thereto, the present embodiment makes the TVS diode 140 conduct current only when a voltage equal to or greater than the rated voltage for starting the power supply apparatus 100 is applied thereto, whereby the TVS diode 140 does not conduct current in a low voltage section, in which the input voltage is lower than the rated voltage. Accordingly, no current flows to the Zener diode 150, and the voltage across the two ends of the Zener diode 150 becomes zero voltage, and thus no voltage is applied to the control unit 180 in FIG. 4. Therefore, in this case, the power supply apparatus 100 cannot start its operation. In other words, before the input voltage, increasing from 0V, reaches the rated voltage, the power supply apparatus 100 does not start its operation.

Figure 5:
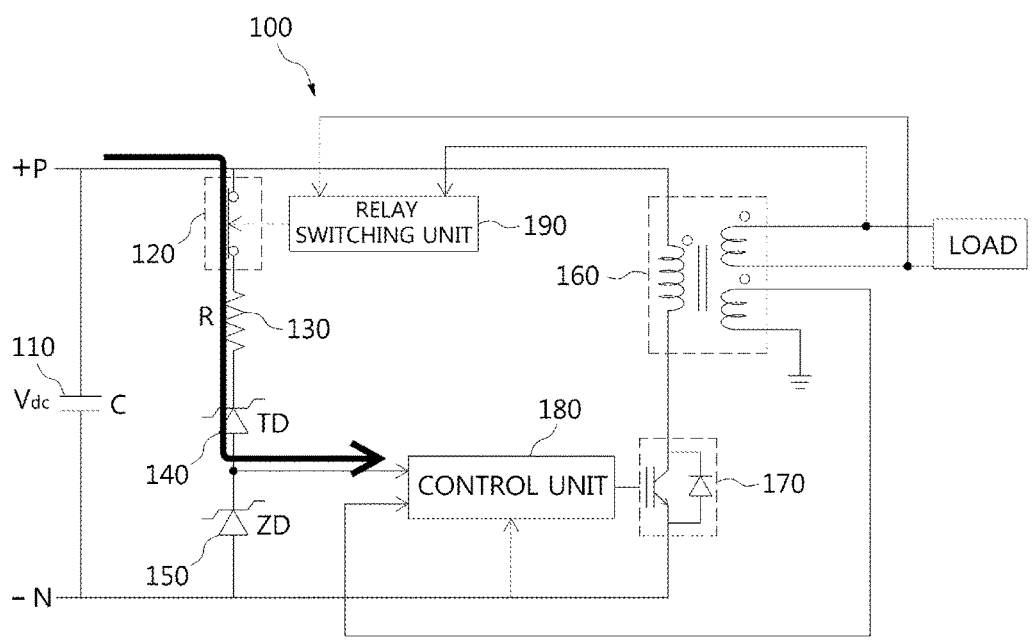

Referring to the example of FIG. 5, the input voltage continuously increases, and when the input voltage reaches the rated voltage for starting the power supply apparatus 100, the TVS diode 140 conducts the current so as to apply it to the control unit 180. Accordingly, the control unit 180 turns on the switch 170.

Figure 6:
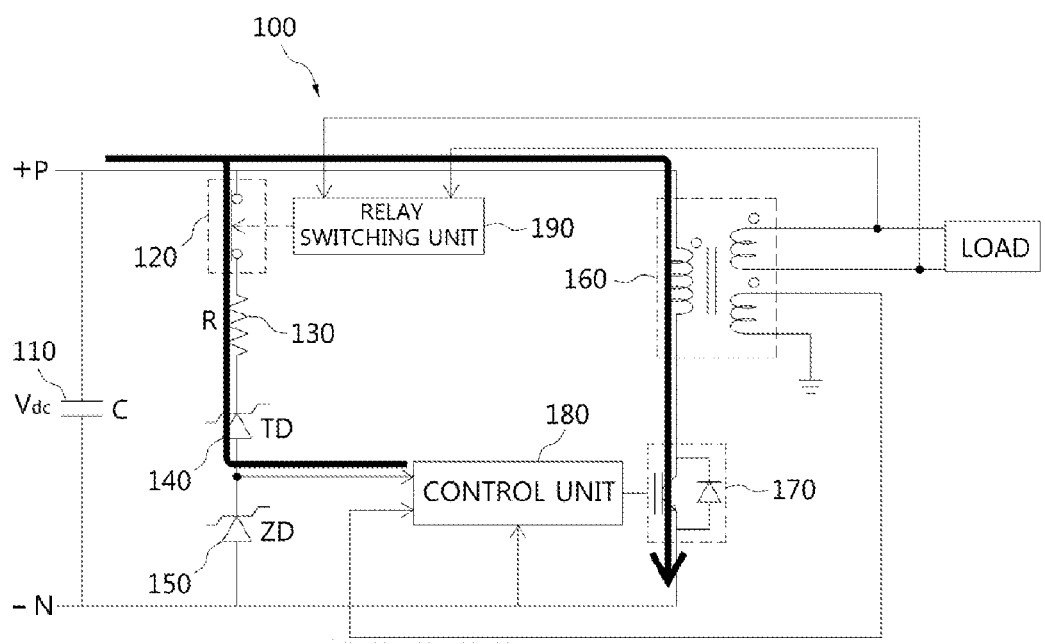

The example of FIG. 6 shows that the switch 170 is turned on and the current flows to the transformer 160. Accordingly, the power supply apparatus 100 starts to operate, and the transformer 160 delivers the voltage applied to the primary winding to the secondary winding. The secondary winding of the transformer 160 outputs a voltage, which is converted according to the ratio of winding turns. The secondary voltage is supplied to the control unit 180 and the relay switching unit 190. Here, as mentioned above, the secondary voltage supplied to the control unit 180 may be the same as or different from the secondary voltage supplied to the relay switching unit 190. If the two voltages need to differ from each other, it is desirable to divide the secondary winding into two different windings having different ratios of winding turns, so that the two different windings output different voltages. Here, the secondary voltage supplied to the control unit 180 is used as power for operating the control unit 180, and the secondary voltage supplied to the relay switching unit 190 switches the b-contact switch in the relay unit 120 to an open state.

Figure 7:
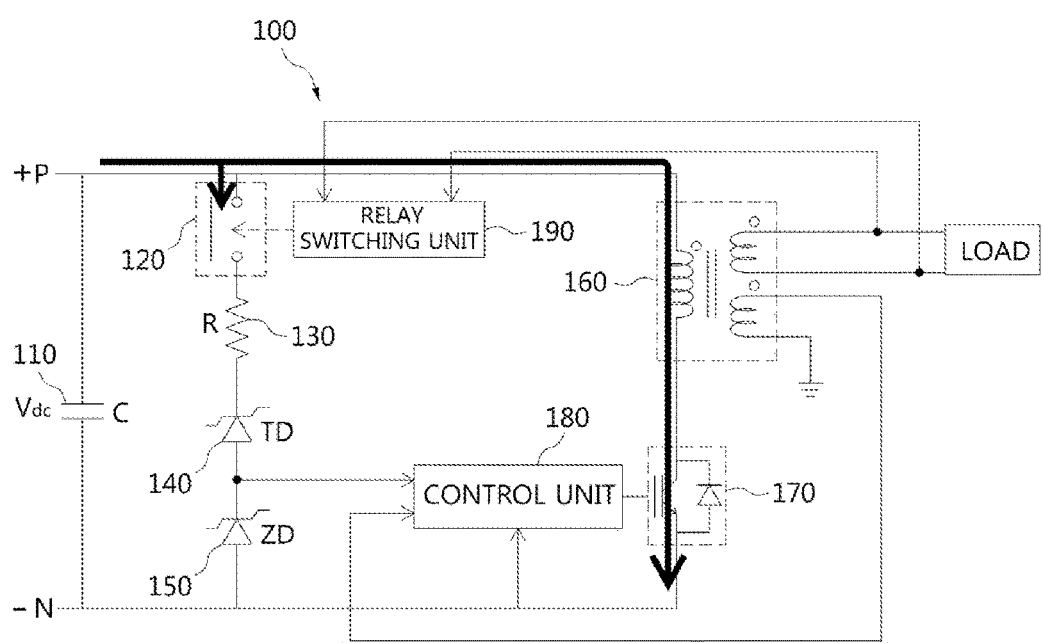

The example of FIG. 7 shows the flow of current when the b-contact switch in the relay unit 120 is open. When the b-contact switch is open, because the current in the relay unit 120 is interrupted, no current is applied to the control unit 180 through the relay unit 120. Accordingly, only the voltage output from the secondary winding of the transformer 160 is supplied to the control unit 180 as the voltage for operating the control unit 180. Here, the control unit 180 operates the power supply apparatus 100 using this voltage.

As described above, in the power supply apparatus 100 for sub-modules of an MMC according to the present invention, only when the input voltage is equal to or greater than the rated voltage for starting the power supply apparatus 100 does the power supply apparatus 100 start to operate. Also, when the power supply apparatus 100 starts its operation and generates a normal output voltage, only the normal output voltage is used as operating power. Therefore, unnecessary operation in the conventional art, that is, the repeated interruption and resumption of the operation of the power supply apparatus 100, may be eliminated, and the generation of heat and power loss in the resistor and Zener diode may be greatly reduced.

As described above, although all components constituting an embodiment of the present invention have been described as being combined into one element or being operated as a single unit, the present invention is not limited thereto. That is, all components may be selectively combined into one or more components and operated. Also, the terms such as "include," "comprise," or "have" specify the presence of the stated element but do not preclude the addition of one or more other elements unless otherwise specified. Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as having ideal or excessively formal meanings unless they are definitely defined in the present specification.

The above description is merely an illustration of the technical spirit of the present invention, and those having ordinary knowledge in the technical field to which the present invention pertains can make modifications and variations within the range that does not depart from the essential characteristics of the present invention. Accordingly, the disclosed embodiments of the present invention are not intended to limit the technical spirit of the present invention but to illustrate the technical spirit of the present invention, and the scope of the technical spirit of the present invention is not limited to these embodiments. The range of protection of the present invention should be interpreted based on the following claims, and all technical spirit within the range equivalent to the claims should be construed as falling within the range of the rights of the present invention.

The invention claimed is:

1. An apparatus for supplying power to a sub-module of a Modular Multilevel Converter (MMC), comprising:
a charging unit in which an input voltage between P and N buses of the MMC is stored;
a relay unit connected in parallel with the charging unit;
a resistor connected in series with the relay unit;
a TVS diode connected in series with the resistor;
a Zener diode connected in series with the TVS diode;
a transformer for delivering the input voltage received in a primary winding to a secondary winding thereof;
a switch connected to the primary winding of the transformer in series for switching a flow of current supplied to the transformer;
a control unit for enabling current to flow to the transformer by turning on the switch upon receiving a clamping voltage of the Zener diode; and
a relay switching unit for operating the relay unit upon receiving a voltage output from the secondary winding of the transformer,
wherein, when the input voltage reaches a rated voltage, the control unit turns on the switch so that a closed circuit is formed by the switch and the primary winding of the transformer, and thereby makes the current flow through the switch and the primary winding, and then the transformer outputs the voltage as a secondary voltage, and
wherein, the relay switching unit operates to open the relay unit by using the secondary voltage and opens so that no current is applied to the control unit through the relay unit.

2. The apparatus of claim 1, wherein the input voltage increases from 0 V to a predetermined maximum voltage (Vmax).

3. The apparatus of claim 2, wherein:
the relay unit includes a b-contact switch, and an initial state of which is set to a shorted state; and
before the increasing input voltage reaches the rated voltage for starting the power supply apparatus, the TVS diode does not conduct current, which is supplied through the b-contact switch, wherein no current flows to the control unit.

4. The apparatus of claim 3, wherein:
when the input voltage increases and reaches the rated voltage, the TVS diode conducts the supplied current so as to be supplied to the control unit; and
the control unit turns on the switch when the supplied current is applied to the control unit.

5. The apparatus of claim 4, wherein:
when the switch is turned on, a primary voltage is supplied to the transformer by the supplied current;
the transformer outputs the secondary voltage by delivering the primary voltage to the secondary winding; and
the relay switching unit receives the secondary voltage and opens the b-contact switch of the relay unit.

6. The apparatus of claim 5, wherein:
after the b-contact switch of the relay unit is opened, the clamping voltage of the Zener diode is not input to the control unit; and
the control unit operates by receiving the secondary voltage of the transformer as operating power.

* * * * *